Dec. 27, 1966 J. G. FONTAINE 3,294,339

SEAT BELT AND LOCKING MEANS THEREFOR

Filed July 23, 1964 2 Sheets-Sheet 1

INVENTOR.
JOHN G. FONTAINE

BY
ATTORNEY

Dec. 27, 1966      J. G. FONTAINE      3,294,339

SEAT BELT AND LOCKING MEANS THEREFOR

Filed July 23, 1964      2 Sheets-Sheet 2

INVENTOR.
JOHN G. FONTAINE
BY
*James V. Ogles*
ATTORNEY

United States Patent Office 3,294,339
Patented Dec. 27, 1966

3,294,339
SEAT BELT AND LOCKING MEANS THEREFOR
John G. Fontaine, 2817 NE. 26th Court,
Fort Lauderdale, Fla. 33306
Filed July 23, 1964, Ser. No. 384,649
5 Claims. (Cl. 242—107.4)

This invention relates to safety-belt retracting means and more particularly for safety belts of the type employed in automobiles, aeroplanes and possibly on other vehicles.

The advantages of retracting means for safety belts, and by which the belts are drawn out of the way when not in use are known and the present invention contemplates means by which the belt is not only retracted but which includes means for insuring that the belt is prevented against extension when in use.

It is therefore an object of the invention to provide a belt-retracting means which will insure the safe disposition of the belt around the passenger by automatically locking the belt against extension after it has been fitted around the wearer.

More particularly, the invention contemplates the provision of a belt-retracting means in which a belt section is provided on a spring-retractible roller, the roller being normally maintained against rotation to prevent extension or retraction, by pawl-and-ratchet means. The invention contemplates freeing means for the pawl-and-ratchet means, consisting of a solenoid, effective when energized, to render the pawl-and-ratchet means ineffective to hold the belt roller against rotation, whereby the spring biasing means for the roller can rotate it to cause retraction of the belt section. The invention additionally contemplates the provision of means by which the pawl-and-ratchet means are caused to be released from the influence of the solenoid and are caused to become operative on the roller and prevent its rotation after a given period of time.

Thus, what the invention primarily accomplishes is the provision of means for automatically locking the belt against extension or retraction after it has placed itself in active protective position about the passenger.

A further object of the invention is to provide a variable adjusting seat belt retractor that requires no belt adjustment at the buckle end regardless of where the movable front seat is positioned.

A further object of the invention is to provide a mechanism so constructed that the belt remains locked at all times against extension without the application of outside energy, even to the extent of providing a means of prohibiting it from being unlocked inadvertently when more than five pounds of weight is applied against the belt.

A still further object of the invention is to provide a mechanism, simple to construct and to meet strict safety standards, that does not depend upon inertia to lock and that is locked at all times without the application of outside energy and causes retractor spring pressure when in use to be eliminated completely from around the waist of the wearer.

A still further object of the invention is to provide a mechanism that when energized permits the wearer freedom of movement momentarily without unbuckling the belts and to permit the operator to close or open a door from the opposite side of the vehicle or to wind the window on the other side of the vehicle or to have access to the glove compartment.

Still another object of the invention is to provide a mechanism, locked at all times when not energized, variable as to length of belt contained and that when two of these units are utilized for each passenger instead of using existing equipment to retract the buckled belts and to permit the wearer to position the buckles to any comfortable place around the waist.

With these and other objects to be hereinafter set forth in view, I have devised the arrangement of parts to be described and more particularly pointed out in the claims appended hereto.

In the accompanying drawings, wherein an illustrative embodiment of the invention is disclosed, FIG. 1 is a perspective view of a belt-retracting device constructed in accordance with the invention, but with a casing part removed in order to show construction;

Figure 1:
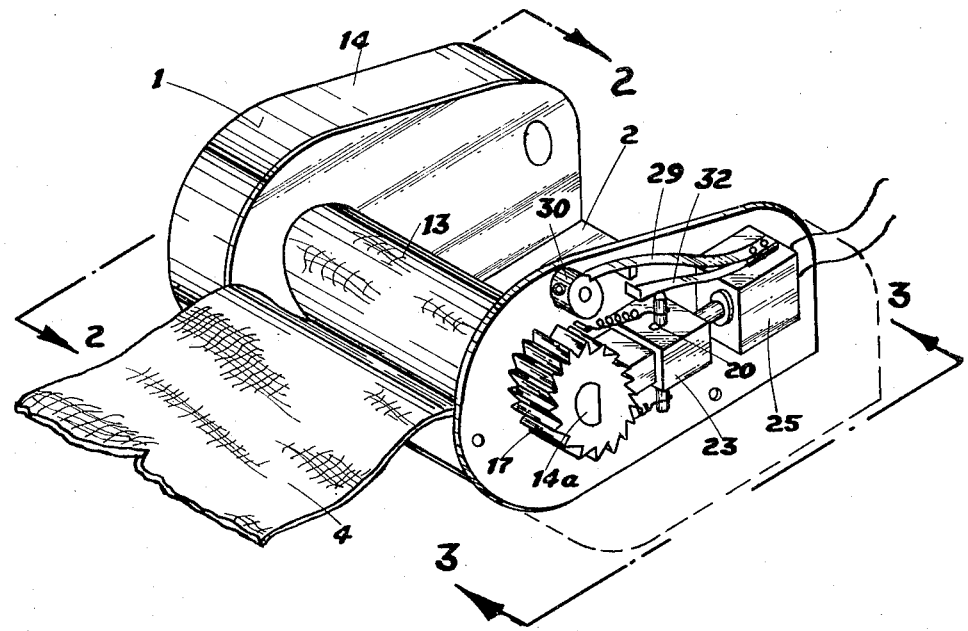
Figure 4:
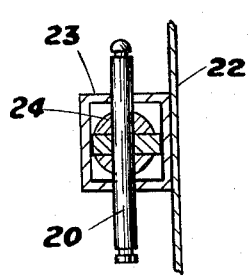
FIG. 4 is a sectional view, taken substantially on the line 4—4 of FIG. 3, looking in the direction of the arrows.
Figure 3:
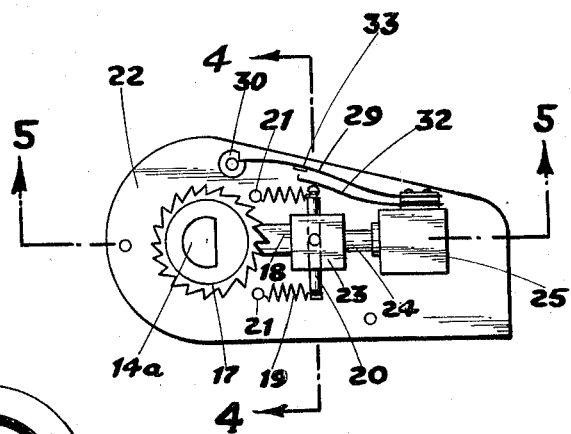
FIG. 3 is a view taken on the line 3—3 of FIG. 1, looking in the direction of the arrows.
Figure 2:
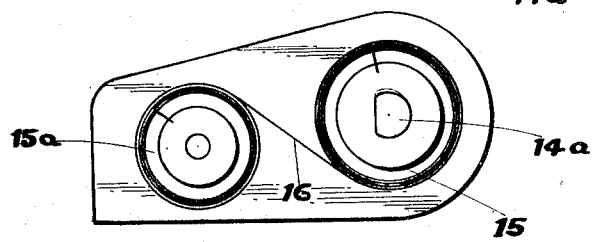
FIG. 2 is a side elevational view of the device, taken on the line 2—2 of FIG. 1, looking in the direction of the arrows.
Figure 5:
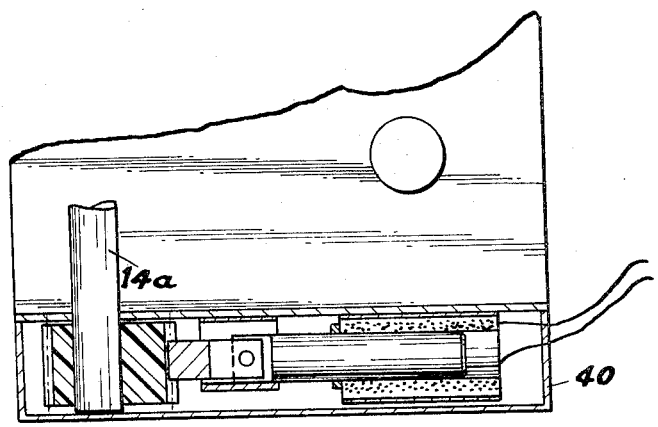
FIG. 5 is a sectional view, taken substantially on the line 5—5 of FIG. 3, looking in the direction of the arrows.
Figures 6, 7:
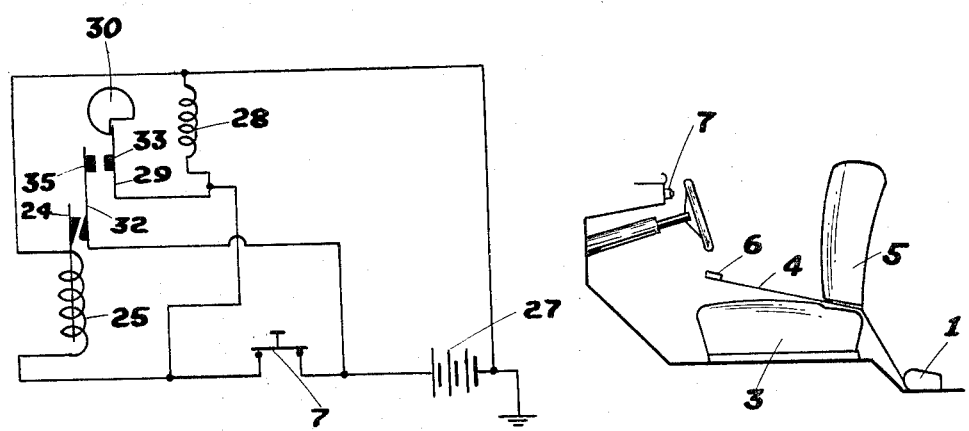
FIG. 6 shows the electrical circuit for the device.
FIG. 7 is a diagrammatic view showing the manner in which the belt-retracting device is mounted behind the seat of a vehicle.

Referring to the drawings, 1 indicates generally the structure and mounting means for the retracting device, such means including a base plate 2 by which the device may be attached to the floor of the car or other vehicle adjacent to the seat to be used by the occupant. In FIG. 7 the device 1 is shown as being mounted on the floor behind the seat 3, with the belt 4 extending from the retracting device, passing between the seat and the seat back 5 to reach the place of extension around the body of the user occupying the seat. The buckle or connector for the belt is shown at 6 and a switch, such as a push-button type for controlling the operation of the retracting device is shown mounted on the instrument panel at 7. The switch 7 can, if desired, be conveniently placed elsewhere.

Figure 8:
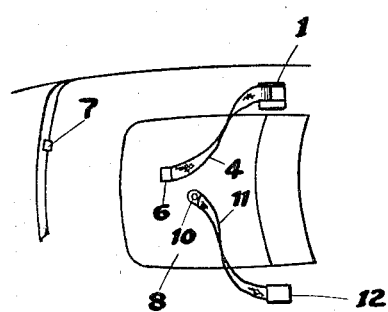
FIG. 8 shows the mounting of the device alongside of the seat.

In FIG. 8 is shown another manner of mounting the belt-retracting means 1 and particularly in connection with a so-called "bucket seat." Therein such a bucket seat is shown at 8 and the retracting means 1 is mounted on the floor alongside of the seat. The second or co-operating section of the belt is shown at 11, and the same may be fixed or it can be capable of retraction by any known means, such as might be contained in a housing 12. The belt section 11 is provided at its ends with the conventional coupling plate 10 for engagement with the buckle 6 in the known manner.

The drum or roller upon which the belt 4 is wound, is shown at 13 and the same is adapted to be rotated to retract the belt 4 by spring means contained in a housing 14 which surrounds one end of the shaft 14a carrying the roller 13. Shaft 14a carries a drum 15 encircled by a torsional spring 16 tending to rotate drum 15 in a wind-up direction and thus to cause a wind-up of the belt 4 on the roller 13. Spring 16 is engaged with a co-operating drum 15a.

Mounted on the opposite end of the shaft 14a is a ratchet wheel 17 engaged by a pawl 18. The pawl is spring-biased and is normally held in engagement with the ratchet wheel 17 by means of coil springs 19 which extend between the ends of a vertical pin 20 and pins 21 projecting from the vertical wall 22 of a housing 40 similar to the housing 14. The pin 20 passes through the pawl which is slidably guided in a square sleeve 23 mounted on the wall 22. The rear end portion of the pawl 18 is coupled to a cylindrical part forming the armature 24 of a solenoid 25 mounted on the wall 22. This arrangement is such that when the solenoid 25 is energized, the pawl 18, coupled to the armature 24 by the pin 20, will be retracted and disengaged from the ratchet 17 so that the shaft 14a can then be rotated under the influence of spring 16 and roller 13 will then be rotated to thereby retract the belt 4.

The electrical circuit for effecting the control of the apparatus is shown in FIG. 6. Therein the push-button switch 7, mounted on the instrument board or other desired location, is connected to the battery 27 of the car as shown and to a heater coil 28 that is employed to heat and thereby distort a thermostatic switch or bi-metallic strip 29. The bi-metallic strip 29 is adjustable by means of the rotary post 30 to thereby control the length of time required to cause it to open the circuit to the solenoid. The pin 23, when the pawl is retracted by operation of the solenoid forces a spring tongue 32 to bring its contact member 35 into engagement with a contact 33 carried by the bi-metallic strip 29, thus maintaining the solenoid energized for a predetermined period of time, such as for a number of seconds. At this time the heater coil is energized so that at the conclusion of the above short period the bi-metallic strip will have become heat-distorted sufficiently to break the circuit to the solenoid, permitting the pawl to then become advanced by the springs 19 to engage the ratchet wheel 17 and lock the roller 13 against unwinding movement.

From the foregoing, the operation of the improved belt-retracting device will be readily understood. The user of the belt, when seated upon the seat indicated at either 3 or 8 in FIGS. 7 and 8 respectively, first extends the belt presently on the car, or that shown at 11 in FIG. 8, to its extended position, and then draws out the belt 4 for the required distance to enable the buckle 6 to be engaged by the plate 10 and the two belt sections thus coupled together about the wearer. The fitting of the belt about the wearer in the manner above described is done after the push button switch 7 has been depressed to energize the solenoid which by its energization has withdrawn the pawl 18 from its engagement with the ratchet 17 so that the shaft 14a can be revolved to permit the extension of the belt section 4. When the two belt sections are coupled together by the interengagement of the buckle 6 and the plate 10 the bi-metallic strip 29 will have become heat-distorted to an extent to break contact between the contact points 33 and 35, thus de-energizing the solenoid and causing the spring 19 to engage the pawl 18 with the ratchet 17 to prevent any unwinding or extension of the belt 4. The belt will thus remain locked against extension until freed by the use of the push-button switch 7. To free the belt, the push-button switch 7 is depressed, and the solenoid will then become energized to retract the pawl and allow the belt to be then retracted by the pull of the retracting spring 16. Again after a short period of time, the belt will become locked against extension.

The belt section shown at 11 may be spring-retracted in any known manner or it may be stationary.

The arrangement described is such that the failure of the belt-user to properly prevent the belt from extending movement is prevented by the means which automatically locks the belt within a given time after it has been fitted around the user.

The described construction is such that if the push-button switch 7 is depressed accidentally or otherwise while the belt is in position of wear, a retraction of the belt will not be effected since the pressure of the wearer's body on the belt will prevent retraction of the belt during the period of disengagement of the pawl from the ratchet.

Figure 9:
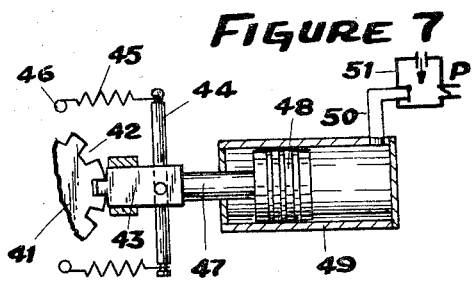
FIG. 9 is a modified form of the invention illustrating a locking and release mechanism for the roller.

In the modified form of the device as illustrated in FIG. 9, the roller shaft 14a is provided with a disk 41 and the marginal edge of the disk is transversely notched as shown at 42. Movable into the notches 42, is a locking pawl 43 having a cross bar 44, the opposite ends of which are coupled to retracting springs 45. The springs 45 are also connected to posts 46 fixed upon the end wall 22 of the apparatus and whereby the pawl 43 is constantly biased toward the notches 42. Means are provided to withdraw the pawl 43 from the notches 42, comprising a piston rod 47, connected to a piston 48 movable within a cylinder 49. The piston 48 is actuated through the medium of either a vacuum or hydraulic means communicating with the cylinder 49 through a suitable conduit 50. The conduit 50 is connected to a source of supply for either the vacuum or hydraulic fluid by a bleed valve 51 calculated to retract the piston 48 and the pawl 43 rapidly in one direction and to retard the return movement of the piston 48 under the influence of the springs 45 permitting the device to remain in an unlocked position for a predetermined number of seconds and to permit movement or adjustment of the belt mechanism.

It should here be particularly pointed out that there has been provided an adjustable retractable seat belt unit that is locked at all times normally or when de-energized. The device definitely prevents the belt from being unwound or pulled out and also has sufficient locking means to prevent the belt from winding in against the spring pressure, thereby removing that spring pressure from the torso of the body of the user when the belts are on. With two of these units installed for each passenger, the passenger would then be able to move the buckle to any position desired, either fully right or fully left. It is important to observe, that if a passenger inadvertently pressed the push button, when pressure is on the pawl, the unit would not unlock as the overriding pressure on the pawl is sufficient to make the solenoid inoperative.

Having thus described an embodiment of the invention, it is obvious that the same is not to be restricted thereto, but is broad enough to cover all structures coming within the scope of the annexed claims.

What I claim is:

1. A belt retracting device having a spring-urged belt take-up roller on which a belt is wound, a ratchet carried by the roller, a spring-urged pawl normally engaging the ratchet to hold the roller against belt unwinding movement, solenoid means operative on the pawl to disengage the same from the ratchet upon the energization of the solenoid means and delay-creating means for causing a dwell between the energization of the solenoid and its de-energization to thereby permit disengagement of the pawl from the ratchet during such dwell and enabling the belt to be extended or retracted.

2. A safety belt retracting device comprising, a belt take-up roller on which a belt is wound, means for applying a rotative force on the roller to cause it to wind a belt upon it, pawl and ratchet means operative to prevent unwinding movement of the take-up roller, and electrically-controlled means for rendering the pawl and ratchet means temporarily inoperative to thereby permit unwinding movement of the roller, and electrically-controlled means being effective to render the pawl and ratchet means operative to prevent unwinding movement of the roller after a lapse of a predetermined period of time.

3. A belt-retracting device comprising, a belt take-up roller, spring means effective on said roller to cause the wind-up of a belt on the roller, a ratchet wheel carried by the roller, a spring-biased pawl normally engaging the ratchet wheel to prevent rotation of the roller and the extension of the belt from said roller, a solenoid operative upon the pawl to disengage the same from the ratchet wheel when the solenoid is energized, a switch for controlling a flow of current from a power source to the solenoid to energize the same whereby the solenoid when so energized will act to disengage the pawl from the ratchet wheel and permit rotation of the roller and the extension of the belt therefrom, and a second switch effective to break current to the solenoid after lapse of a predetermined period to thereby permit the pawl to engage the ratchet wheel under the bias of its springs and prevent rotative movement of the roller and extension of the belt therefrom.

4. A belt-retracting device as provided for in claim 3, wherein the second switch is thermostatically controlled, and means for regulating the time period during which the pawl and ratchet are inoperatively disposed in respect to one another.

5. In a safety belt retracting device, a tensioned belt roller on which a belt is wound, means for locking said roller against unwinding movement, means for freeing the roller from said locking means to thereby permit its belt-unwinding movement, and means for thereafter automatically rendering the locking means effective to prevent unwinding of the belt after lapse of a given period of time, the locking means for the roller including a pawl and ratchet; the means for freeing the roller from the locking means comprising a solenoid, and the means for rendering the locking means effective comprising a thermostatic switch operative to open circuit to the solenoid after a given lapse of time.

References Cited by the Examiner

UNITED STATES PATENTS

| | | | |
|---|---|---|---|
| 2,708,966 | 5/1955 | Davis | 297—386 |
| 2,825,581 | 3/1958 | Knight | 297—388 X |
| 2,852,270 | 9/1958 | Hunt | 297—388 X |
| 2,883,123 | 4/1959 | Finnigan | 297—388 X |
| 2,905,231 | 9/1959 | Olson | 297—388 X |
| 3,142,102 | 7/1964 | Saunders | 297—385 X |
| 3,146,027 | 8/1964 | Winberg | 297—385 |
| 3,172,700 | 3/1965 | Haas | 297—385 X |
| 3,174,704 | 3/1965 | Replogle | 242—107.4 |
| 3,193,327 | 7/1965 | Roe | 297—385 X |

FRANK B. SHERRY, *Primary Examiner.*

CASMIR A. NUNBERG, *Examiner.*

J. S. PETRIE, *Assistant Examiner.*